United States Patent [19]

Devanney

[11] 4,292,506

[45] Sep. 29, 1981

[54] FUEL PUMP COMPUTER PRICE VARIATOR

[75] Inventor: Raymond H. Devanney, Winsted, Conn.

[73] Assignee: Veeder Industries Inc., Hartford, Conn.

[21] Appl. No.: 35,991

[22] Filed: May 4, 1979

[51] Int. Cl.³ .......................... B67D 5/22; F16H 3/22; G06C 15/04

[52] U.S. Cl. .............................. 235/61 L; 235/61 M; 235/94 A; 74/348

[58] Field of Search ................ 235/61 L, 61 M, 94 R, 235/94 A; 74/340, 348, 681, 417

[56] References Cited

U.S. PATENT DOCUMENTS 2,653,690 9/1953 Saracchi ................................ 74/340

4,136,573 1/1979 Smilgys et al. ....................... 74/681

FOREIGN PATENT DOCUMENTS 354268 10/1905 France ................................. 74/340

*Primary Examiner*—L. T. Hix

*Assistant Examiner*—Benjamin R. Fuller

*Attorney, Agent, or Firm*—Prutzman, Kalb, Chilton & Alix

[57] ABSTRACT

Means for converting a fuel pump computer from a maximum unit volume price of 99 and 9/10 cents established by a conventional mechanical variator of the computer to a higher maximum unit volume price of either $1.49 and 9/10 cents or $1.99 and 9/10 cents and employing a selective adder mechanism installed in a mechanical register of the computer for manually selectively adding either $0.50 or $1.00 to a base unit volume price established by the variator.

6 Claims, 4 Drawing Figures

FUEL PUMP COMPUTER PRICE VARIATOR

The present invention relates generally to mechanical fuel pump computers having (a) a mechanical variator for example of the type disclosed in U.S. Pat. No. 3,413,867 of Richard B. Hamlin, dated Dec. 3, 1968, and entitled "Variator" and employed for establishing a unit volume price of gasoline within an available three place price range and (b) a mechanical register for example of the type disclosed in U.S. Pat. No. 2,814,444, dated Nov. 26, 1957 and entitled "Register", and the present invention relates more particularly to new and improved conversion means for modifying mechanical computers of conventional design employed in single product and multiple product fuel dispensing systems for expanding the unit volume price range of the computer.

Because of the increasing cost of gasoline, the price for a gallon of gasoline in the not too distant future may exceed the maximum available unit volume price of 99 9/10 cents per gallon of the "full" range variators of conventional single-product fuel pump computers in the field and the maximum available unit volume price of $1.11 and 9/10 cents per gallon of conventional multiple-product fuel pump computers in the field.

It is, therefore, a principal aim of the present invention to provide new and improved conversion means for modifying conventional computers for extending the unit volume price range to a maximum unit volume price substantially above $1.

It is another aim of the present invention to provide a new and improved unit volume price adder mechanism for a conventional fuel pump computer which permits the unit volume price range of the computer to be shifted only once to a higher unit volume price range.

It is another aim of the present invention to provide a new and improved computer adder mechanism for selectively shifting the unit volume price range of a computer in two stages which accommodate the existing unit volume price and a future substantial increased unit volume price.

It is a further aim of the present invention to provided new and improved computer conversion means of the type described for modifying conventional mechanical computers at relatively low cost.

It is another aim of the present invention to provide a new and improved computer adder mechanism for upwardly shifting the unit volume price range of conventional mechanical fuel pump computers and which permits conversion of existing fuel pump equipment with minimum inconvenience and down time.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
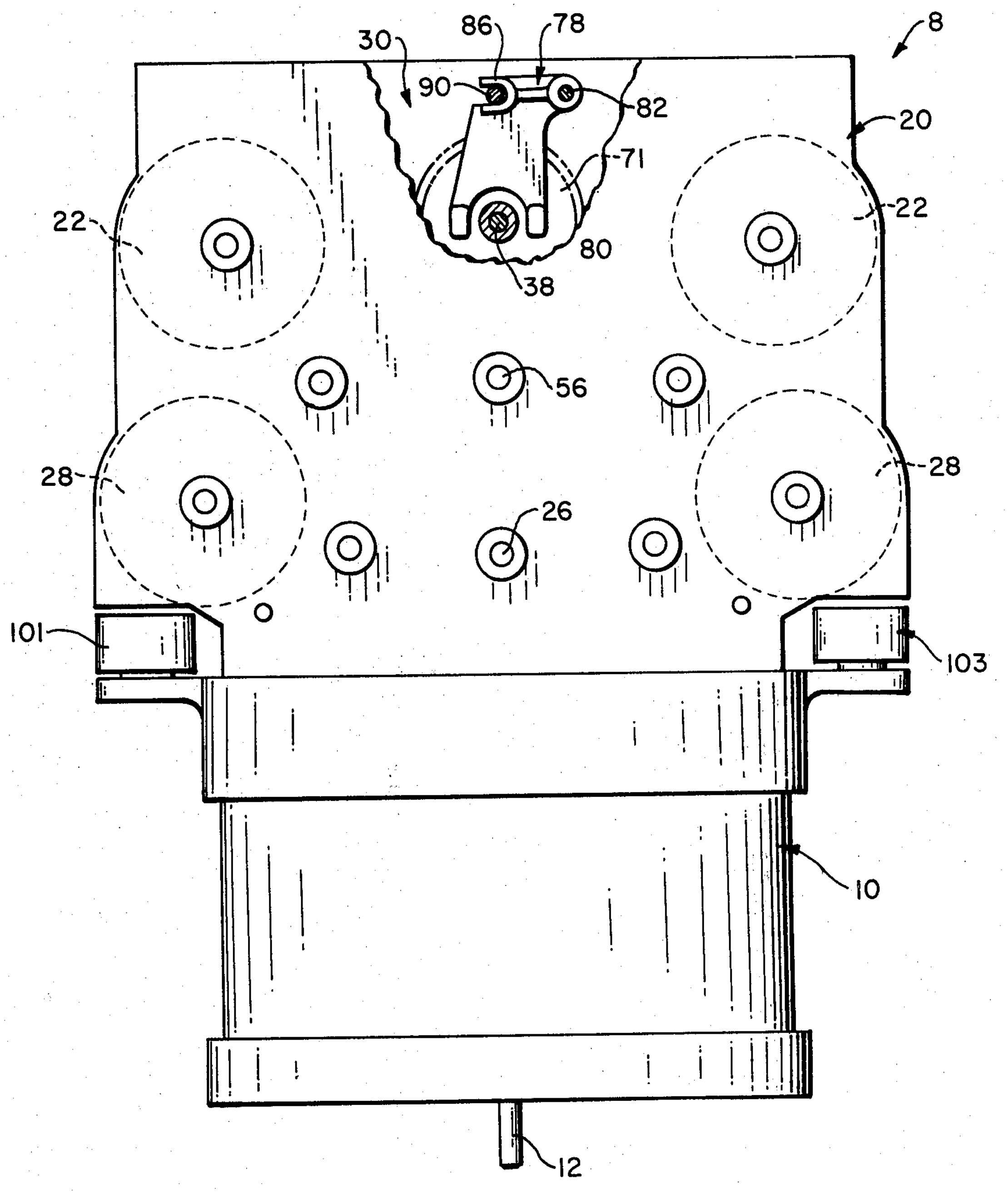
FIG. 1 is an elevation view, partly broken away and partly in section, of a fuel pump computer incorporating an embodiment of a price adder mechanism of the present invention.

Referring now to the drawings in detail wherein like reference numerals indicate like parts throughout the several figures, there is shown a fuel pump computer 8 having a mechanical price variator or change speed mechanism 10 for establishing and posting a unit volume price of gasoline within a three place unit volume price range.

The variator 10 which is shown may be identical to the variator shown and described in U.S. Pat. No. 3,413,867 excepting as hereinafter described and therefore will not be described in detail herein. Briefly, however, the variator 10 comprises a center drive shaft 12 which is suitably connected to be rotated by a conventional fuel meter (not shown) of a gasoline dispensing system (not shown) in accordance with the volume amount of gasoline dispensed. In particular, the variator center shaft 12 is rotated four revolutions for each unit volume of fuel dispensed on which the unit volume price of the fuel is based (i.e., typically one gallon). The variator 10 has a price mechanism (not shown) with three range arms (not shown), and each range arm is adapted to be selectively set for establishing a corresponding place amount of a three place unit volume price. In particular, the three range arms provide for establishing a tenth cent place amount of the unit volume price with the lowest place range arm, a cent place amount with the intermediate place range arm and a ten cent place amount with the highest place range arm. The three range arms of the conventional variator are therefore adapted to be set for establishing any unit volume price within a range of 00 and 0/10 cents to 99 and 9/10 cents inclusively.

A cost output or drive gear 16 rotatably mounted on the variator center drive shaft 12 is driven by the variator price mechanism in accordance with the price established by the three range arm settings. The cost drive gear 16 drives a vertical cost shaft 18 of a register 20 (of the type disclosed in the aforementioned U.S. Pat. No. 2,814,444 but modified in accordance with the present invention as hereinafter described) to rotate a pair of opposed cost counters 22 of the register 20 for registering the cost amount of gasoline dispensed in accordance with the volume amount of gasoline dispensed and the three place unit volume price established by the three range arm settings. Likewise, a volume drive gear 24 secured to the upper end of the variator center shaft 12 is connected to drive a horizontal volume shaft 26 of the register 20 for rotating a pair of opposed volume counters 28 of the register 20 for registering the volume amount of gasoline dispensed.

In accordance with the present invention, a selective adder mechanism 30 is installed in the register 20 for selectively adding a unit volume price adder to the base unit volume price established by the variator price mechanism (not shown). In the shown example, the selective adder mechanism 30 provides for selectively adding either a 50 cent adder or a $1 adder to the base price established by the variator 10. Thus, where 50 cents is added to the base price of the variator 10, the unit volume price range of the computer is shifted to shift the maximum unit volume price from 99 and 9/10 cents to $1.49 and 9/10 cents. Where $1 is added to the base price established by the variator 10, the unit volume price range is shifted to shift the maximum unit volume price from 99 and 9/10 cents to $1.99 and 9/10 cents. In both cases, the lowest available unit volume price is also shifted by the adder increment and the variator 10 still provides a full 99 and 9/10 cent price range for accommodating day to day price fluctuations and also variations between different gasoline products where the adder mechanism 30 is used in multiple product equipment.

Figure 2:
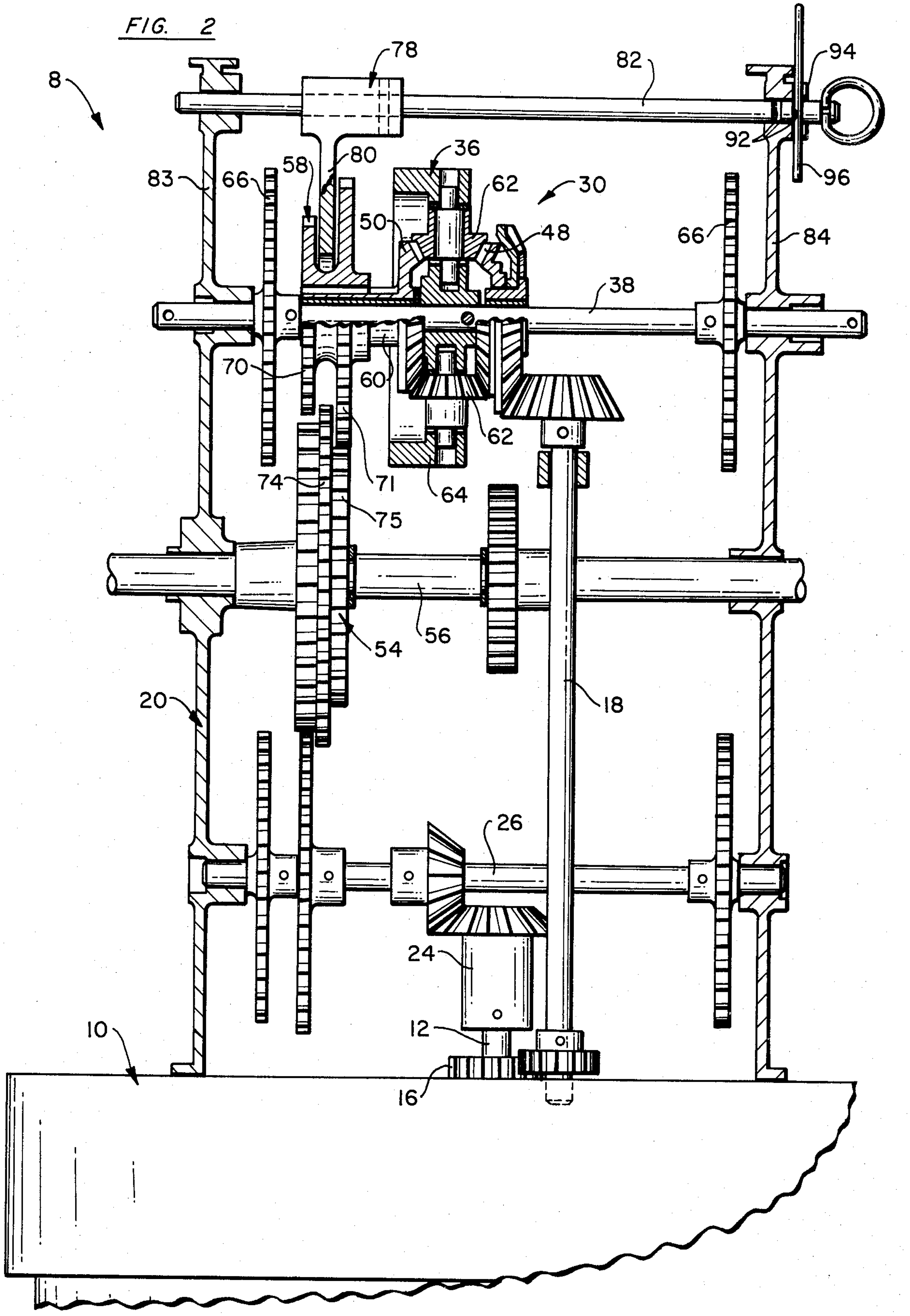
FIG. 2 is an enlarged partial elevation section view, partly broken away and partly in section, of a register of the fuel pump computer.
Figure 3:
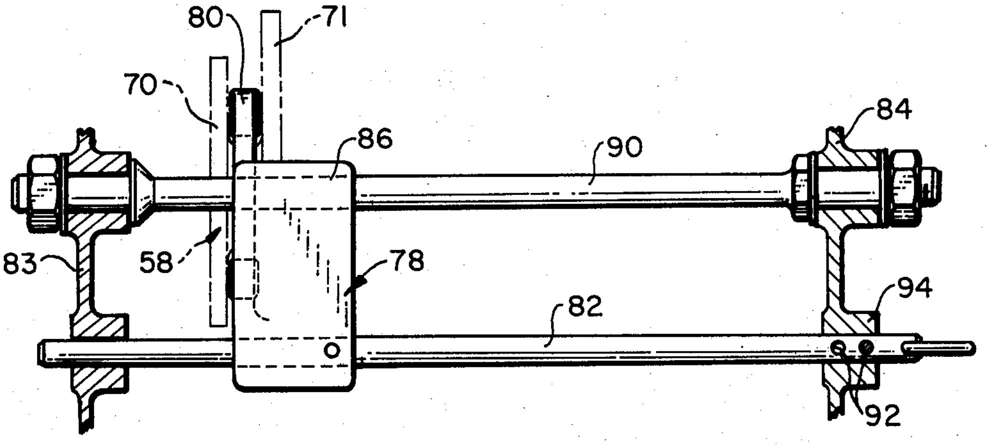
FIG. 3 is an enlarged partial top plan view, partly broken away and partly in section, of the register.
Figure 4:
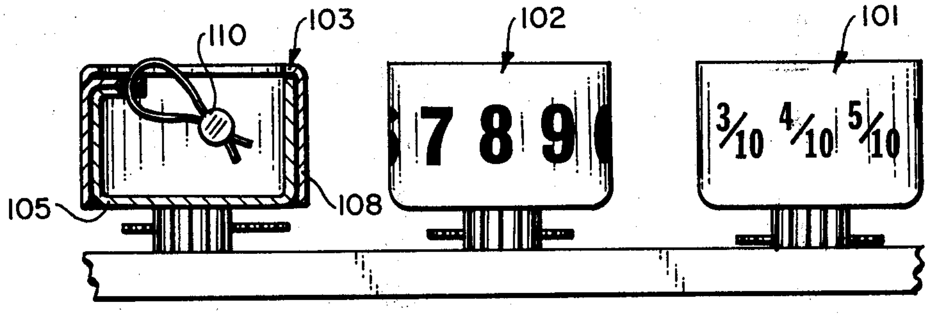
FIG. 4 is an enlarged front elevation view, partly broken away and partly in section, showing a set of price posting wheels of a variator of the fuel pump computer.

Referring to FIGS. 2 and 3, the adder mechanism 30 comprises a summation differential mechanism 36 mounted on a horizontal cost shaft 38 of the register 20. A first input bevel gear 48 of the summation mechanism 36 is driven by the vertical cost shaft 18 and a second input bevel gear 50 is driven by the vertical volume shaft 12 via the horizontal volume cross shaft 26, a three element compound gear 54 rotatably mounted on a horizontal center cross shaft 56, and a compound selector gear 58 axially shiftable on a splined sleeve 60 of the second input bevel gear 50. A pair of bevel planetary gears 62 are mounted on a planet gear carrier 64 for engagement with the two input bevel gears 48, 50, and the planet gear carrier is secured to the horizontal cost shaft 38 for driving the two opposed cost counters 22 via a pair of cost drive gears 66 secured to opposite ends of the cost shaft 38. The gear ratios of the two separate drives through the summation mechanism 36 are established so that (a) the vertical cost shaft 18 is connected for driving the cost counters 22 to register an amount equal to the product of the volume amount of fuel dispensed and a base three place unit volume price established by the settings of the three range arms of the variator 10, and (b) the horizontal volume shaft 26 is connected for driving the cost counters 22 in accordance with a unit volume price adder established by the axial setting of the compound selector gear 58. The compound selector gear 58 has two axially spaced gears 70, 71 of different diameter which are selectively engageable with two axially spaced gears 74, 75 of corresponding different diameter of the intermediate compound gear 54. In its axial position shown in the drawings with its larger diameter gear 71 in engagement with the intermediate compound gear 75, the adder mechanism 30 provides a 50 cent adder. With the selector gear 58 in its alternative axial position with its smaller diameter gear 70 in engagement with the intermediate compound gear 74, the adder mechanism 30 provides a $1 adder. Thus, the selector gear 58 is selectively axially shiftable between 50 cent and $1 adder positions for selectively adding 50 cents and $1 respectively to the base unit volume price established by the variator 10.

For selectively axially shifting the selector gear 58, a slide 78 is provided having a bifurcated end 80 receivable between the axially spaced gears 70, 71 of the selector gear 58. The slide 78 is secured to a horizontal selector shaft 82 axially shiftable within openings in the opposed parallel side plates 83, 84 of the register 20 and has a U-shaped end 86 receiving a conventional mounting stud 90 of the register 20 which thereby serves as a guide for the slide 78. The selector shaft 82 is axially shiftable between two operative positions thereof corresponding to the two operating positions of the selector gear 58. The selector shaft 82 has a pair of axially spaced apertures 92 and the register side plate 84 has a boss 94 with a complementary aperture 96 for locking the selector gear 58 with a suitable spring clip or cotter pin in each of its two operative positions. Accordingly, the computer 8 can be readily shifted from a 50 cent adder position providing a computer price range of $0.50 and 0/10 cents to $1.49 and 9/10 cents to a dollar adder position providing a computer price range of $1.00 and 0/10 cents to $1.99 and 9/10 cents.

The variator 10 has oppositely facing sets of three aligned numeral price posting wheels 101–103 of ascending order of significance connected to be automatically set by the three respective range arms (not shown) of the variator 10. The lowest place and intermediate place price posting wheels 101, 102 are of conventional design and bear a sequence of indicia of 0–9, whereas a substitute highest place numeral wheel assembly 103 provides for selectively posting the two separate adders provided by the selector adder mechanism 30. In the 50 cent adder position of the adder mechanism 30, a highest place price wheel 105 is provided which bears a sequence of indicia of 5–14 inclusively for the 0–9 settings of the highest place variator range arm (not shown). Similarly, for the $1 adder position of the adder mechanism 30, a highest place price wheel cap or cover 108 is provided which bears a sequence of indicia of 10–19 inclusively for the 0–9 positions of the highest place variator range arm (not shown). The $1 cap or cover 108 is mounted on the price wheel 105 when the adder mechanism is shifted to the $1 setting. For that purpose a suitable wire seal 110 or the like may be provided for sealing the $1 adder cap 108 on the 50 cent adder price wheel 105. In that regard, the selective adder mechanism 30 is adapted to be maintained in the 50 cent adder position as long as the unit volume price of gasoline does not exceed the maximum available price of $1.49 and 9/10 cents. Also, the adder mechanism can be permanently shifted to the $1 adder position when the unit volume price substantially exceeds the $1.00 and 0/10 cent minimum unit volume price with the $1 adder setting, and whereby, because of inflation etc., it is exceedingly unlikely that the adder mechanism would need to be shifted back to the 50 cent adder setting.

Accordingly, it can be seen that the selector adder mechanism 30 provides a first unit volume price adder of 50 cents which is approximately ½ the base unit volume price range of the variator 10 and whereby the 50 cent adder setting can be used at the present time (since the price of gasoline exceeds and is not likely to return to a price level below 50 cents per gallon), and the $1 adder setting can be permanently selected in the future after the unit volume price increases to above $1. Thus, the adder mechanism 30 provides a $1 adder in two 50 cent steps and whereby the existing $1 range of the conventional variator 10 can be expanded in two steps, each substantially less than (i.e., approximately one-half of) the base unit volume price range of the variator 10. As a result, the adder mechanism 30 has to be shifted only once and does not have to be shifted back and forth as in prior art devices as the unit volume price of gasoline fluctuates back and forth around the $1 amount.

A fuel pump register 20 employing the selector adder mechanism 30 of the present invention is also useable with a conventional blendor or multiple product computer (for example of the type having a price selector mechanism as disclosed in U.S. Pat. No. 2,808,908 of E. T. Young, dated Apr. 7, 1959 and entitled "Apparatus for Dispensing And Pricing Selected Blends of Two Liquids") for shifting the unit volume price range of the multiple product computer (i.e., a price range of $0.10 and 0/10 cents to $1.11 and 9/10 cents in the conventional multiple product price selector mechanism in the field). Thus, as in the computer application shown in the drawings, the two incremental adder steps of 50 cents each provided by the adder mechanism 30 would enable the multiple product price selector mechanism to be converted initially using the 50 cent adder and then permanently when the unit volume price for the lowest priced product increases further by approximately 50 cents.

As will be apparent to persons skilled in the art, various modifications, adaptations and variations of the foregoing specific disclosure can be made without departing from the teachings of the present invention.

I claim:

1. In a fuel delivery pump computer mechanism having a drive shaft connected to be driven in accordance with the volume amount of fuel delivered, a price selector mechanism driven by the drive shaft and selectively settable for selectively establishing an adjustable unit volume price within a predetermined price range with a predetermined maximum unit volume price of at least 99 and 9/10 cents and having a rotary cost output driven in accordance with the volume amount of fuel delivered and the selected unit volume price established by the setting of the price selector mechanism, and a register having a volume counter connected to be driven by the drive shaft for registering the volume amount of fuel delivered and a cost counter for registering the cost amount of fuel delivered, the computer mechanism having a price adder mechanism in the register for establishing a unit volume price adder to the selected unit volume price of the price selector mechanism and connected for driving the cost counter for registering the cost amount of fuel delivered in accordance with the volume amount delivered and registered by the volume counter and the sum of the selected price established by the price selector mechanism and the price adder established by the price adder mechanism, the improvement wherein the price adder mechanism is selectively settable independently of the price selector mechanism to either of two operational positions thereof to alternatively selectively establish predetermined first and second substantially different fixed unit volume price adders which provide successive approximately equal fixed increments to the adjustable unit volume price established by the price selector mechanism and which are approximately one-half said predetermined maximum unit volume price.

2. A fuel delivery pump computer mechanism according to claim 1 wherein the first and second unit volume price adders are 50 cents and $1.00 respectively and thereby provide two successive equal incremental increases of 50 cents each to the selected price of the price selector mechanism.

3. A fuel delivery pump computer mechanism according to claim 1 or 2 wherein the price adder mechanism comprises a rotary summation mechanism having an output connected for driving the cost counter, a first input connected to said rotary cost output of the price selector mechanism for driving the cost counter via the summation mechanism for registering the cost amount of fuel delivered in accordance with the selected unit volume price established by the price selector mechanism, and a second input, and a gear selector mechanism connected between the drive shaft and the second input of the summation mechanism and having first coaxial gear means and an axially shiftable selector gear adapted to be axially shifted between first and second operative axial positions thereof in engagement with the first gear means for alternatively selectively establishing said first and second unit volume price adders respectively for driving the cost counter via the summation mechanism for registering the cost amount of fuel delivered in accordance with the selected price adder.

4. In a fuel delivery pump computer mechanism having a drive shaft connected to be driven in accordance with the volume amount of fuel delivered, a base price mechanism driven by the drive shaft and settable for establishing an adjustable base unit volume price within a predetermined range having a predetermined maximum base unit volume price and having a rotary cost output driven in accordance with the volume amount of fuel delivered and the base unit volume price established by the setting of the base price mechanism, and a register having a volume counter connected to be driven by the drive shaft for registering the volume amount of fuel delivered and a cost counter for registering the cost amount of fuel delivered, the computer mechanism having a price adder mechanism in the register settable for establishing a unit volume price adder to the base unit volume price and connected for driving the cost counter for registering the cost amount of fuel delivered in accordance with the volume amount delivered and registered by the volume counter and the sum of the base price established by the base price mechanism and the price adder established by the price adder mechanism, the improvement wherein the price adder mechanism comprises a rotary summation mechanism having an output connected for driving the cost counter, a first input connected to said rotary cost output of the base price mechanism for driving the cost counter via the summation mechanism for registering the cost amount of fuel in accordance with the base unit volume price established by the base price mechanism, and a second input, and a gear selector mechanism connected between the drive shaft and the second input of the summation mechanism, and having first coaxial gear means and an axially shiftable selector gear axially shiftable independently of the base price mechanism between first and second operative axial positions thereof in engagement with the first gear means for alternatively selectively establishing predetermined first and second fixed price adders respectively providing fixed increments to the adjustable base price established by the base price mechanism for driving the cost counter via the summation mechanism for registering the cost amount of fuel delivered in accordance with the selected fixed price adder.

5. In a fuel delivery pump register with rotary volume and cost counters for registering the volume and cost amounts of fuel delivered and having a horizontal volume drive shaft connected for rotating each volume counter for registering the volume amount of fuel delivered, a vertical cost drive shaft adapted to be connected to a unit volume price selector mechanism for being rotated in accordance with the volume amount of fuel delivered and an adjustable base unit volume price established by the price selector mechanism, and a price adder mechanism settable for establishing a unit volume price adder to the base unit volume price and connected for driving each cost counter for registering the cost amount of fuel delivered in accordance with the volume amount delivered and registered by the volume counter and the sum of the base price established by the price selector mechanism and the price adder established by the price adder mechanism, the improvement wherein the price adder mechanism is selectively settable independently of the price selector mechanism to selectively provide predetermined first and second substantially different fixed unit volume price adders which provide two successive approximately equal fixed increments to the adjustable base unit volume price of the price selector mechanism.

6. A fuel delivery pump register according to claim 5 wherein the price adder mechanism comprises a rotary summation mechanism having an output connected for driving each cost counter, a first input connected to said cost drive shaft for driving each cost counter via the summation mechanism for registering the cost amount of fuel in accordance with the base unit volume price established by the price selector mechanism, and a second input, and a gear selector mechanism connected between the horizontal volume drive shaft and the second input of the summation mechanism, and having first coaxial gear means having two coaxial gears and an axially shiftable selector gear adapted to be axially shifted between first and second operative axial positions thereof in engagement with the two coaxial gears of the first gear means for selectively establishing said first and second fixed price adders respectively for driving each cost counter via the summation mechanism for registering the cost amount of fuel delivered in accordance with the selected fixed price adder.

* * * * *